(12) United States Patent
Del Pico Aznar et al.

(10) Patent No.: US 8,438,790 B2
(45) Date of Patent: May 14, 2013

(54) SUPPORT STRUCTURE FOR SOLAR COLLECTOR

(75) Inventors: Javier Del Pico Aznar, Zaragoza (ES); Carlos Tierra Galán, Zaragoza (ES); Sergio Aguilar Cardiel, Zaragoza (ES); Javier Collado Hernández, Zaragoza (ES)

(73) Assignee: Sociedad Anonima Minera Catalano Aragonesa, Zaragoza (ES)

( * ) Notice: Subject to any disclaimer, the term of this patent is extended or adjusted under 35 U.S.C. 154(b) by 571 days.

(21) Appl. No.: 12/709,970

(22) Filed: Feb. 22, 2010

(65) Prior Publication Data

US 2010/0213336 A1 Aug. 26, 2010

(30) Foreign Application Priority Data

Feb. 24, 2009 (EP) ...................................... 09002575

(51) Int. Cl.
*E04B 7/08* (2006.01)
(52) U.S. Cl.
USPC .............. 52/81.3; 52/648.1; 52/638; 136/244
(58) Field of Classification Search .................. 248/676, 248/466, 469, 176.1; 52/81.3, 648.1, 638, 52/173.3, 653.1, 690, 693, 650.1; 343/916, 343/914; 250/203.4, 203.6, 216, 221; 136/244
See application file for complete search history.

(56) References Cited

U.S. PATENT DOCUMENTS

| | | | |
|---|---|---|---|
| 2,284,898 A * | 6/1942 | Hartman | 52/654.1 |
| 3,010,106 A * | 11/1961 | Lippitt et al. | 343/839 |
| 3,263,232 A * | 7/1966 | Burwell et al. | 343/713 |
| 5,058,565 A | 10/1991 | Gee et al. | |
| 5,069,540 A | 12/1991 | Gonder | |
| 5,125,608 A * | 6/1992 | McMaster et al. | 248/163.1 |
| 2004/0118395 A1 | 6/2004 | Rubbia et al. | |
| 2006/0053726 A1* | 3/2006 | Reynolds et al. | 52/633 |
| 2008/0072516 A1* | 3/2008 | Reynolds et al. | 52/694 |
| 2008/0087277 A1 | 4/2008 | Schweyher | |
| 2008/0202048 A1* | 8/2008 | Miller et al. | 52/281 |
| 2008/0204352 A1* | 8/2008 | Reynolds et al. | 343/880 |

FOREIGN PATENT DOCUMENTS

| | | | |
|---|---|---|---|
| AU | 2005218033 A1 * | 8/2006 | |
| EP | 1 588 105 | 10/2007 | |
| ES | U 200801470 | 1/2008 | |
| WO | WO 01/02780 | 1/2001 | |
| WO | WO 2007/034008 | 3/2007 | |
| WO | WO 2011157804 A1 * | 12/2011 | |
| WO | WO 2011162670 A2 * | 12/2011 | |
| WO | WO 2012052579 A1 * | 4/2012 | |

* cited by examiner

*Primary Examiner* — Kimberly Wood
(74) *Attorney, Agent, or Firm* — Notaro, Michalos & Zaccaria P.C.

(57) ABSTRACT

Support structure for solar collector for use in cylindrical parabolic collectors to support a cylindrical parabolic reflector and an absorbing tube The structure includes a main bearing structure on which a plurality of support arms for the parabolic mirrors are supported The main bearing structure is formed by two rectangular lattice grids, a top one and another bottom one, in a parallel and overlaying arrangement, linked together by four laterally-disposed mini-lattices, in twos at each end, and by a plurality of external lateral ties bars and internal diagonal tie bars.

7 Claims, 14 Drawing Sheets

SUPPORT STRUCTURE FOR SOLAR COLLECTOR

BACKGROUND

The present description relates, as its title indicates, to a support structure for solar collectors of the type used in cylindrical parabolic collectors to support the cylindrical parabolic reflector and the absorbing tube, characterized in that it comprises a main bearing structure on which a plurality of support arms for the parabolic mirrors is supported, said main bearing structure being formed by two rectangular lattice grids, a top one and another bottom one, in a parallel and overlaying arrangement, linked together by four laterally-disposed mini-lattices, in twos at each end, and by a plurality of external lateral ties bars and internal diagonal tie bars.

At the moment there are widely used devices for concentrating solar radiation based on cylindrical parabolic collectors, in which the solar energy capture area is formed by high-reflectivity parabolic mirrors that redirect the incident solar radiation and concentrate it on an absorbing tube located along its focal line. Inside the absorbing tube a thermal fluid that is usually oil, flows and absorbs the solar energy in the form of thermal energy, heating up to a temperature of around 400° C. The thermal fluid at this temperature is pumped towards a heat exchanger which generates steam that drives a turbine that is responsible for generating electricity These cylindrical parabolic collectors require the reflective mirrors forming the energy capture area to have a great mechanical precision in their orientation towards the absorbing tube in order to achieve optimum heat transfer and to thus optimize the production of energy.

Furthermore it is essential for the structure that supports the parabolic mirrors and absorbing tube to have the necessary torsional and flexural stiffness to be able to maintain the precision of the focus of the energy capture surface on the absorbing tube, which is particularly important taking into account that solar collectors are usually accompanied by solar tracking mechanisms, in order to achieve optimum production of energy. Several attempts have been made to achieve this combination of torsional and flexural stiffness of the support structure of solar collectors with the capacity to move, by means of different technological solutions.

Devices such as those described in Patent WO 0102780 "Solar collector system" or in European patent 03815132 "Solar energy collector system with an absorber support mounting" that house the mirrors in a kind of box, a solution that has little torsional stiffness, especially if it is associated with a moving tracker device.

Other devices are known such as that disclosed in U.S. Pat. No. 5,058,565 "Solar concentrator device and support structure thereof", which has a simple structure located above, with the problem that it casts shadows on the mirrors with the consequent reduction in energy performance, as well as the fact that the torsional stiffness obtained is not particularly good.

Other solutions have been sought. For example, U.S. Pat. No. 5,069,540 "Parabolic solar collector body and method", US 2004/0118395 "Parabolic solar concentrator module" and US 2008/0087277 "Collector for solar thermal power station" claim solid or semi-solid single-piece support structures that have the drawback of their high cost, heavy weight and problems both with the transport between the production plant and the assembly site as well as the complex nature of on-site mounting.

A solution that is very commonly used resides in a structure formed by a longitudinally-disposed cylinder emerging from which are support arms for the mirrors as is described, for example in WO Patent 20070340048 "Support arm, cylindrical parabolic solar collector support and procedures to manufacture the arm", which, in spite of its good performance, presents both manufacturing and transport problems in the central cylindrical unit and problems with the strength of the arms that only have several laminar folded pieces to reinforce them.

Another solution that has been used to try to improve the stiffness of the structure is to employ lattice structures, for example, such as that described in Spanish Utility Model U 200801470 "Structure for solar tracker", that presents a lattice structure both of the tower and the arms of a photovoltaic solar tracker. The lattice structure offers the advantage of combining a light weight with excellent torsional stiffness, but has the drawback that for large size collectors there is the problem of transport, which means that it has to be mounted on site, making it much more expensive due to the many parts that the structure comprises that must be mounted on site with a high precision, requiring the use of moulds.

To resolve this problem there are some solar collectors that use a lattice support structure formed by four identical grids, in twos and pre-mounted, each one being formed by a frame and a distribution of uprights and diagonal members within said frame, which have to be subsequently joined together on site but which present the drawbacks that the grids are difficult to transport, particularly in the case of large sizes, and many rivets or mechanical couplings are needed, making mounting labour intensive, with the consequent high economic cost. Furthermore there is the added difficulty of managing the whole lattice volume that forms the support structure of the solar field, which must be galvanized in special tanks for such dimensions, complicating the logistics of constructing the associated solar field.

SUMMARY OF THE INVENTION

To resolve the current problem of the ratio between the required torsional stiffness and economic cost involved, the support structure for solar collector that is the subject matter of the present invention has been designed, being formed by a main bearing structure, also known as "torsion box" or "support beam" on which is supported, in a lateral arrangement, a plurality of support arms for the parabolic mirrors, the main bearing structure including two identical rectangular lattice grids, a top one and another bottom one, in a parallel and overlaying arrangement, linked together by four laterally-disposed mini-lattices, in twos at each end, and by a plurality of external lateral tie bars and internal diagonal tie bars.

Emerging perpendicularly from the top part of the main bearing structure is a plurality of supports for the absorbing tube, of an appropriate length to position it in the focus of the parabola formed by the parabolic mirrors mounted on the support arms.

The rectangular grids are formed by an external frame in which is distributed a plurality of cross members with the appropriate angle to optimize the torsional strength of the "torsion box".

The main bearing structure is finished off, at both ends, by two end plates that include the support points for legs anchored to the ground that give the collector assembly the necessary rotation axis.

The particular layout of the diagonal tie bars of the grids has been optimized to optimize their work under torsion. Furthermore the optimization of the lengths, dimensions, thicknesses, number and distribution of the tubes and profiles used in the different lattices that form the collector has enabled the structure to be simplified and its weight to be reduced with the consequent reduction in the cost of materials without losing the characteristics of torsional strength.

The support arms are formed by two perpendicular pieces fitted with two strips and perforations for attachment to the main bearing structure, being linked together by a first slanting piece that goes from the lower part of the vertical piece, passing, approximately in its middle part, through the end of the horizontal piece, and in turn being supported by a second slanting piece that goes from approximately the coupling of the horizontal and vertical pieces up to nearly the top end of the first slanting piece. Between the two slanting pieces, starting from near to the end of the horizontal piece, is a third slanting piece for reinforcement.

The support structure for solar collector presented here, offers numerous advantages over the systems currently available, the most important of these being the considerable reduction in the number of grids required in the construction of the torsion box, decreasing from the four units required by existing models to just two, whilst maintaining or even improving the properties of torsional stiffness and flexural stiffness that characterize said models.

It is noteworthy that the lengths, thicknesses, number and distribution of the elements and bars that form the different lattices of the main bearing structure or "torsion box" have been notably optimized, permitting torsional stiffness and flexural stiffness properties to be obtained that equal or even improve upon the current state of the art, with a considerably lower weight and economic cost.

Another important advantage of this structure is its optimization in relation to mounting and installation thanks to the reduction in the weight of the structure and the standardization of the construction elements.

As a result of the aforesaid, a further advantage is obtained in terms of the cost-effectiveness of transport, improvements in mounting systems and reduction of materials, times and possibility of error, which obviously lead to a reduction in the economic cost of the collector, improving its economic return.

It is particularly noteworthy that the two-grid structure has been designed to reduce manufacturing and transport costs and times as well as on-site mounting times. Its design minimizes the number of parts that form it, also minimizing welds and rivets, whilst guaranteeing and even improving on physical properties such as torsional strength and flexural strength that characterize the existing designs and improving the optical properties of these.

Another important added advantage is that the reduction in the number of parts forming the structure facilitates its final assembly on site, resulting in greater on-site returns and, consequently, a reduction in costs.

Lastly, it is also important to underline that the dimensional parameters of the tubes that form the arms that support the parabolic mirrors have been optimized, also achieving an important reduction in the weight and materials without detriment to their structural strength.

BRIEF DESCRIPTION OF THE SEVERAL VIEWS OF THE DRAWINGS

In order to better understand the object of the present invention, a preferential practical embodiment of a support structure for solar collector has been represented in the attached drawing. In said drawing.

Figure 1:
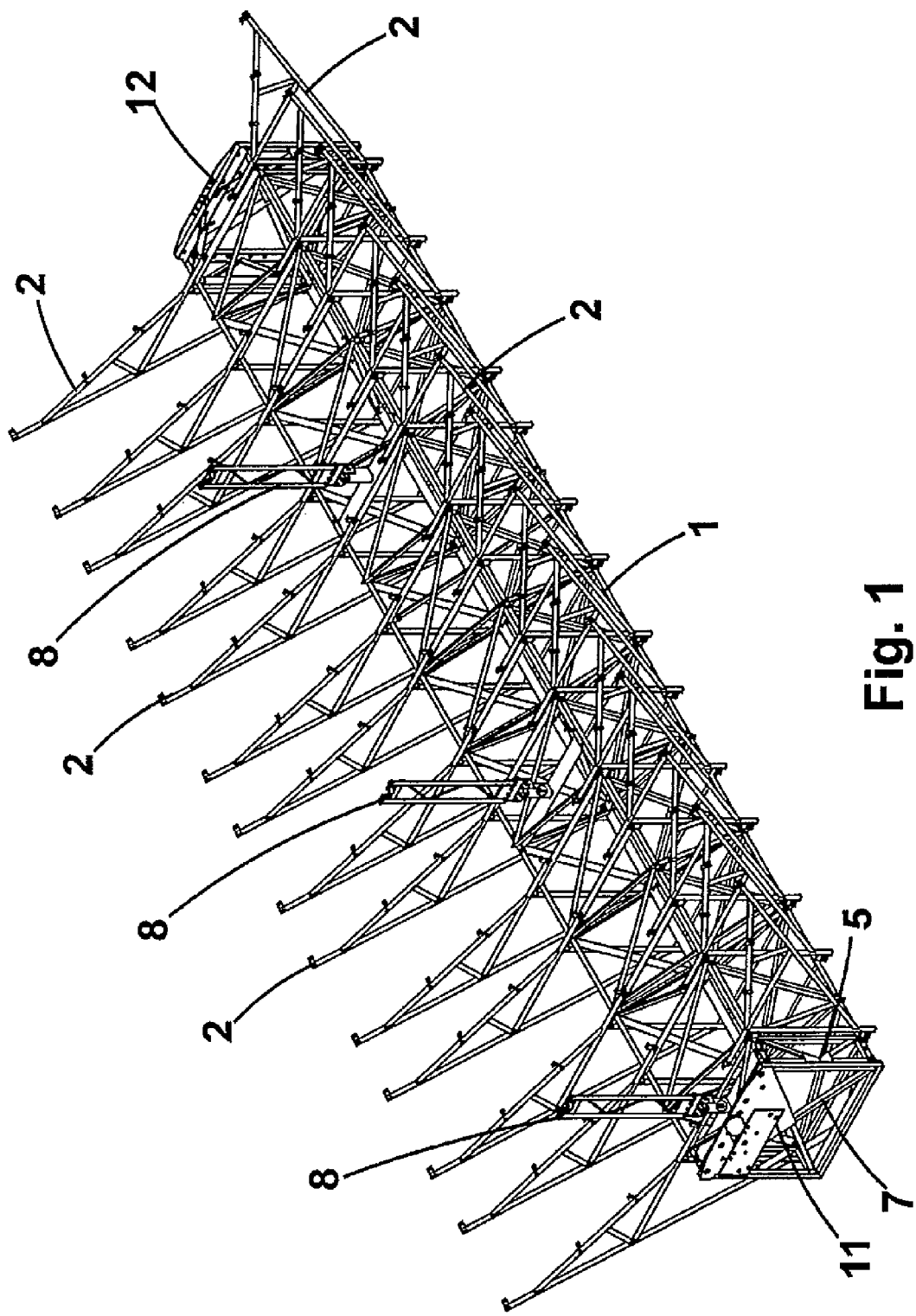
FIG. 1 shows a perspective view of said support structure.
Figure 2A:
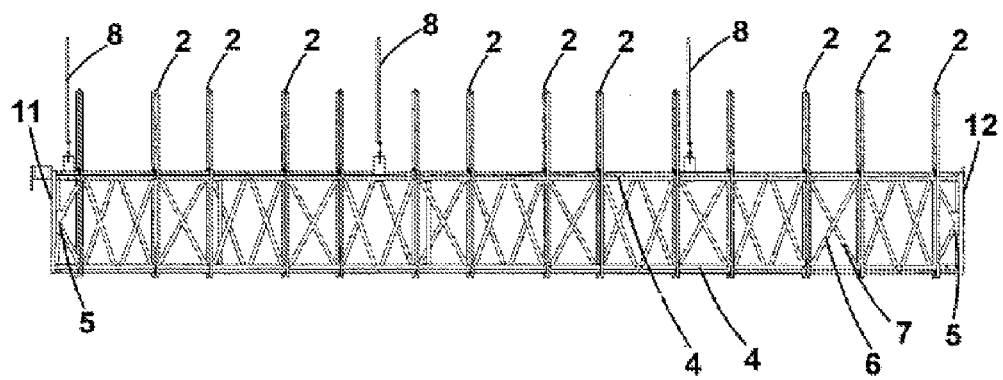
FIGS. 2a and 2b show lateral and front views of the support structure.
Figure 2B:
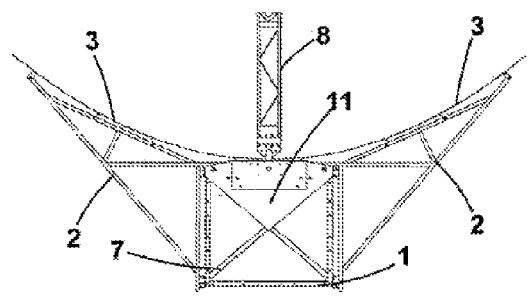
Figure 3:
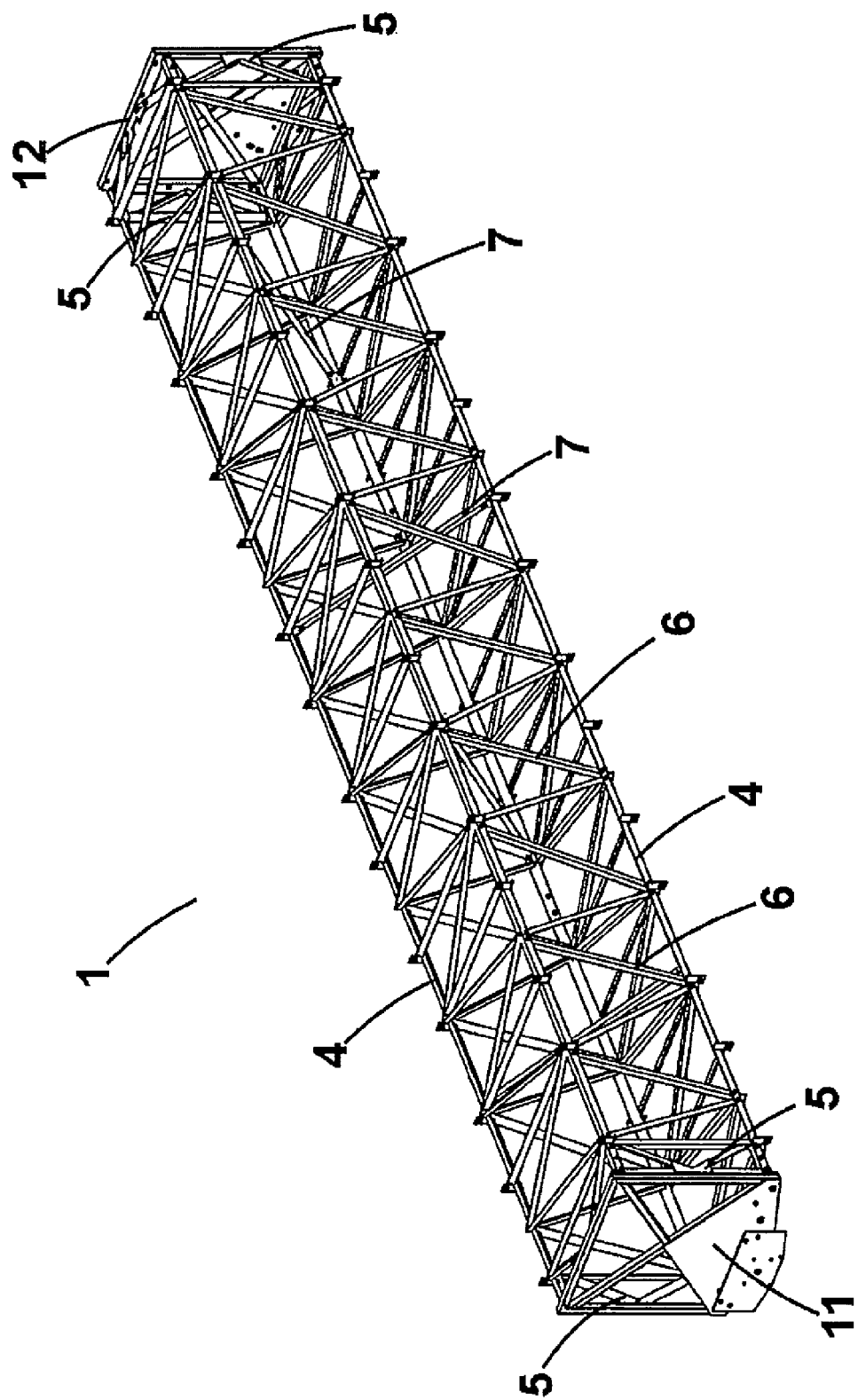
FIG. 3 shows a perspective view of the main bearing structure.
Figure 4:
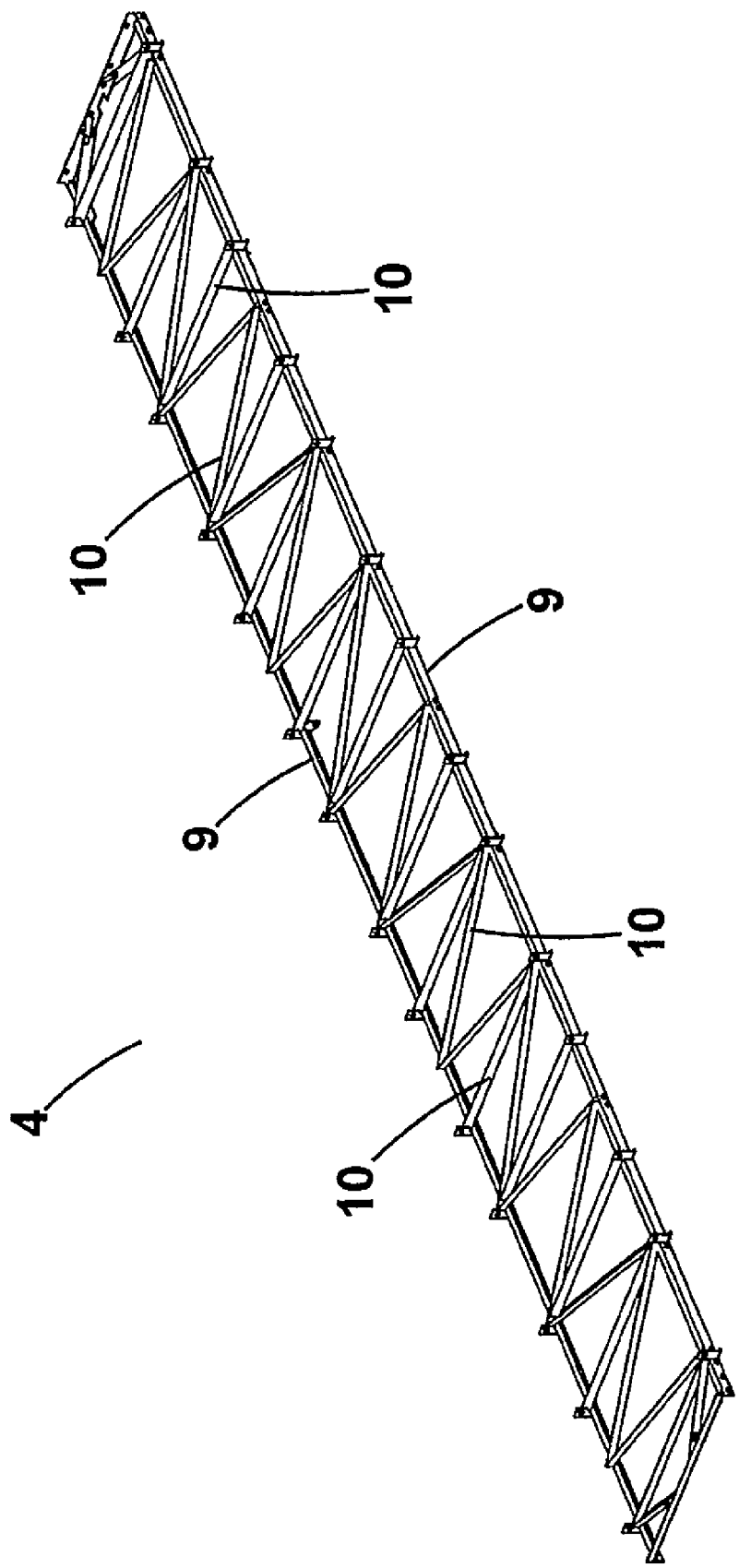
FIG. 4 shows a perspective view of one of the rectangular lattice grids.
Figure 6:
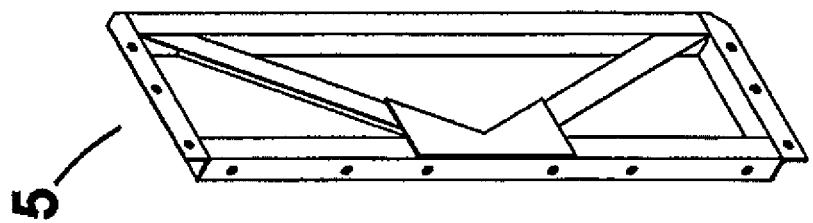
FIG. 6 shows a perspective view of one of the four lateral mini-lattices.
Figure 5:
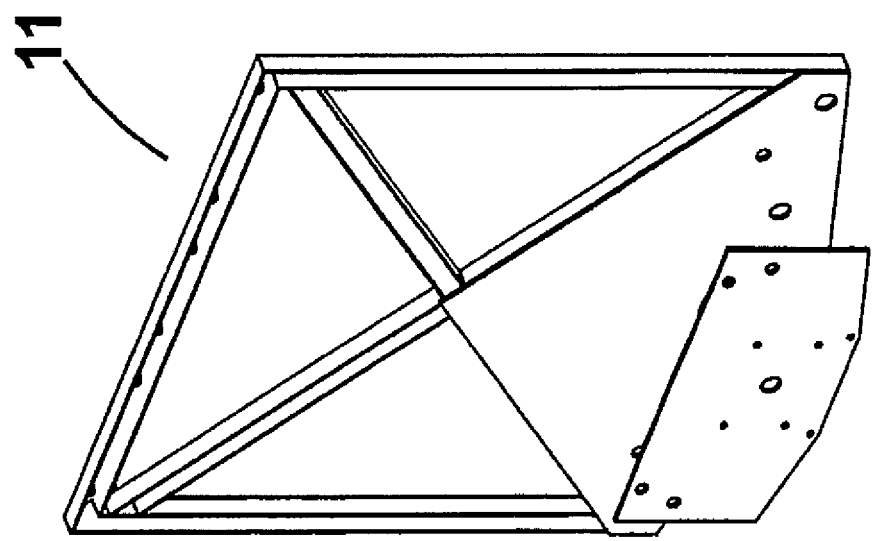
FIG. 5 shows a perspective view of one of the end plates of the main bearing structure.
Figure 7:
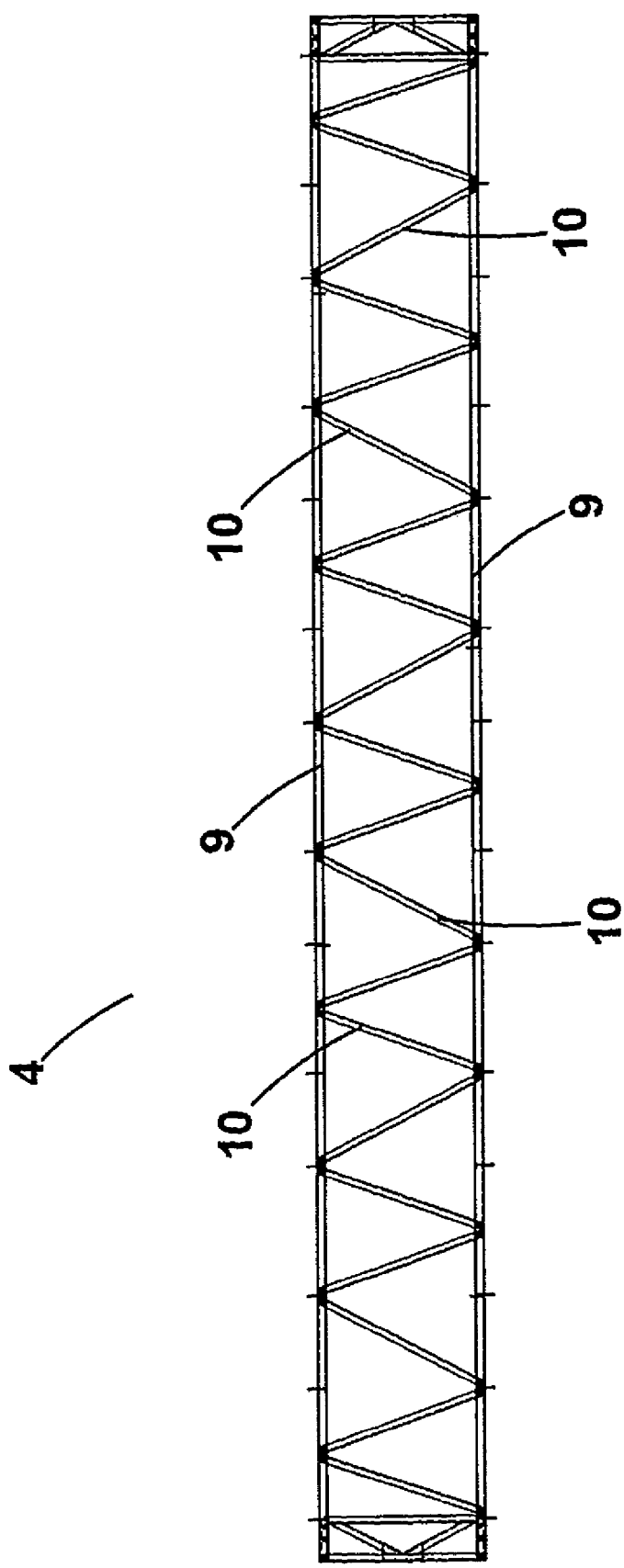
FIG. 7 shows a plan view of one of the rectangular lattice grids.
Figure 8A:
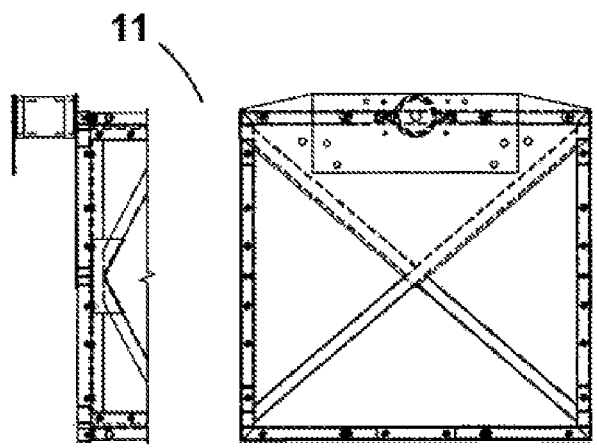
FIGS. 8a and 8b show front and rear views, with lateral details of the main bearing structure, detailing the end plates.
Figure 8B:
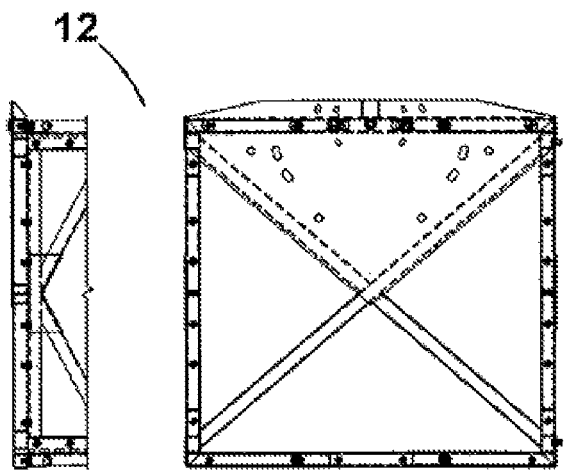
Figure 9A:
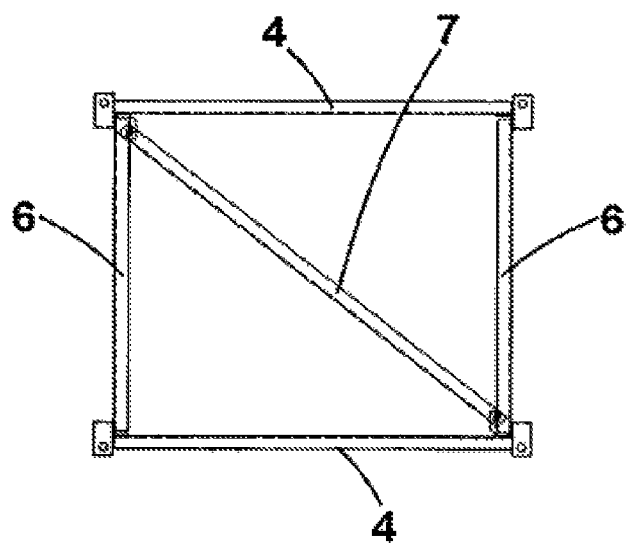
FIGS. 9a and 9b show some intermediate sections of the main bearing structure, detailing the internal diagonal tie bars.
Figure 9B:
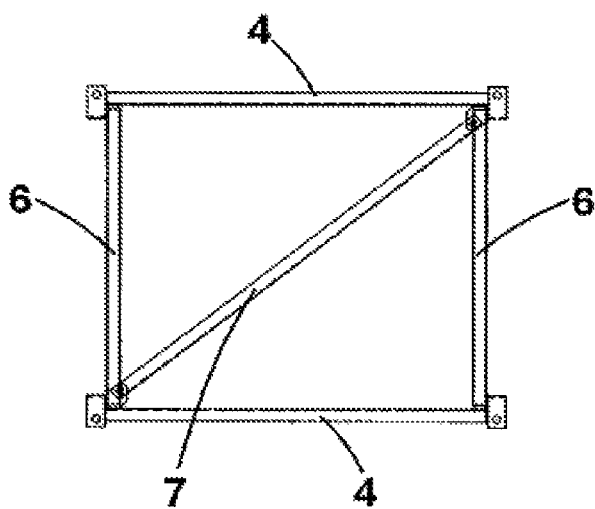
Figure 10A:
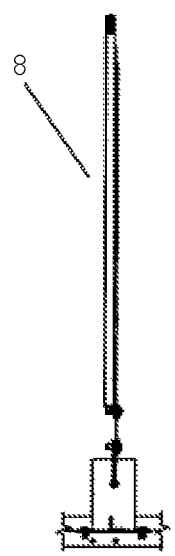
FIGS. 10a and 10b show front and profile views of a detail of one of the supports for the absorbing tube.
Figure 10B:
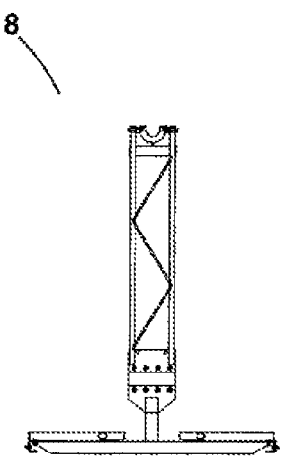
Figure 11A:
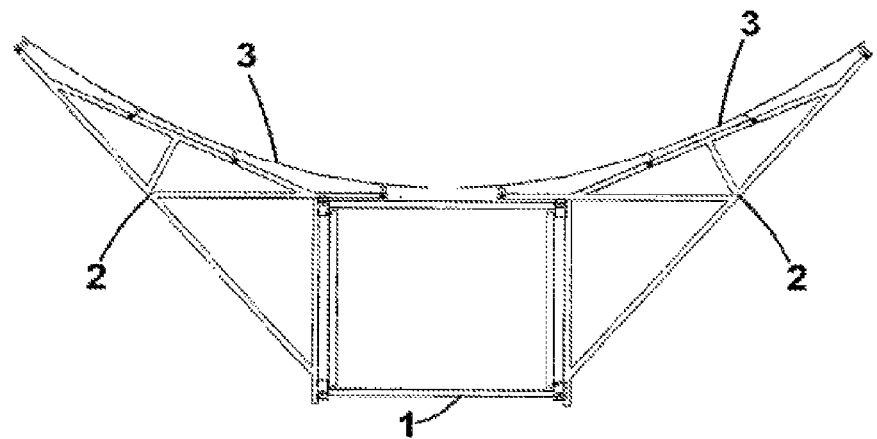
FIGS. 11a and 11b show front and top views of an intermediate detail of the support structure, depicting the support arms for the parabolic mirrors.
Figure 11B:
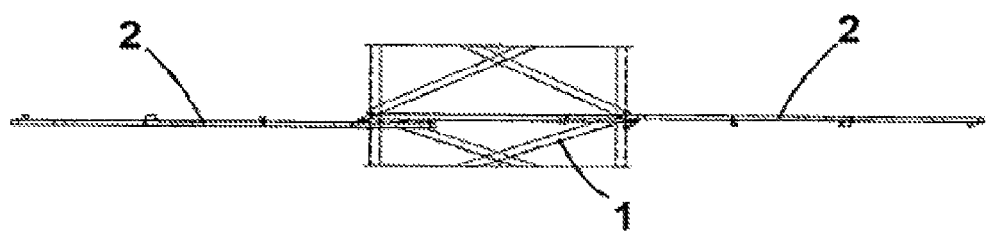
Figure 12A:
FIGS. 12a, 12b, 12c and 12d show side and profile views of the longitudinal members of the main bearing structure.
Figure 12B:
Figure 12C:
Figure 12D:
Figure 13A:
FIGS. 13a, 13b, 13c and 13d show side and profile views of the tie bars.
Figure 13B:
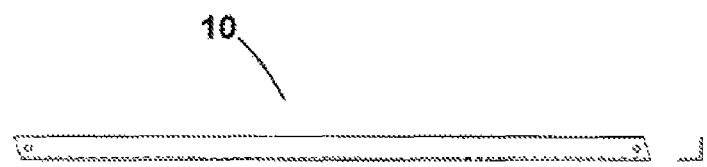
Figure 13C:
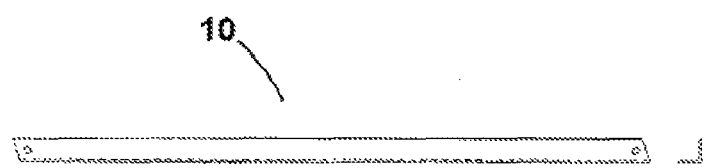
Figure 13D:
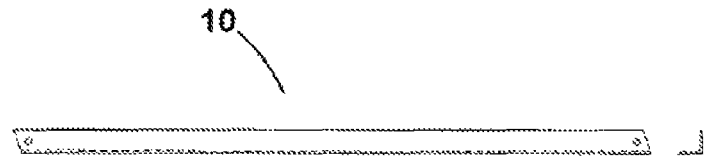
Figure 14:
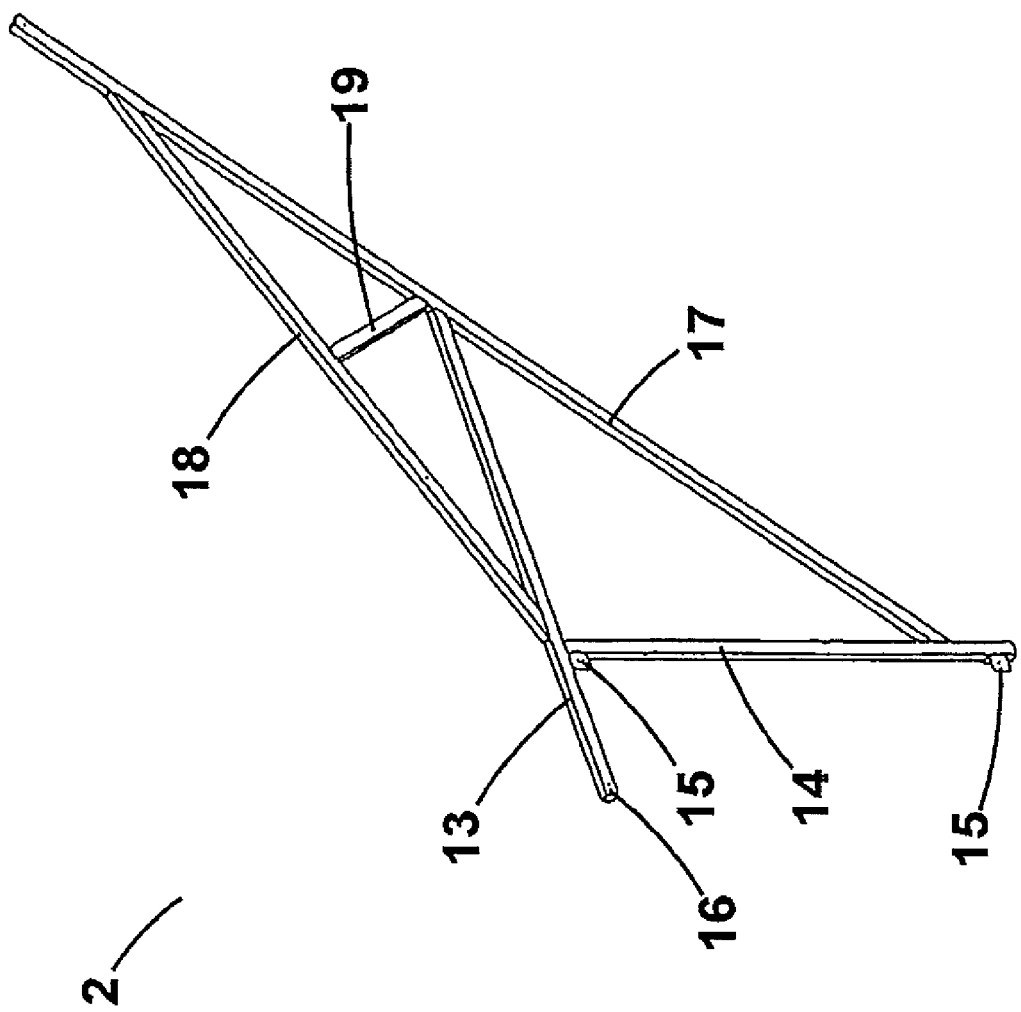
FIG. 14 shows a perspective view of one of the support arms.
Figure 15:
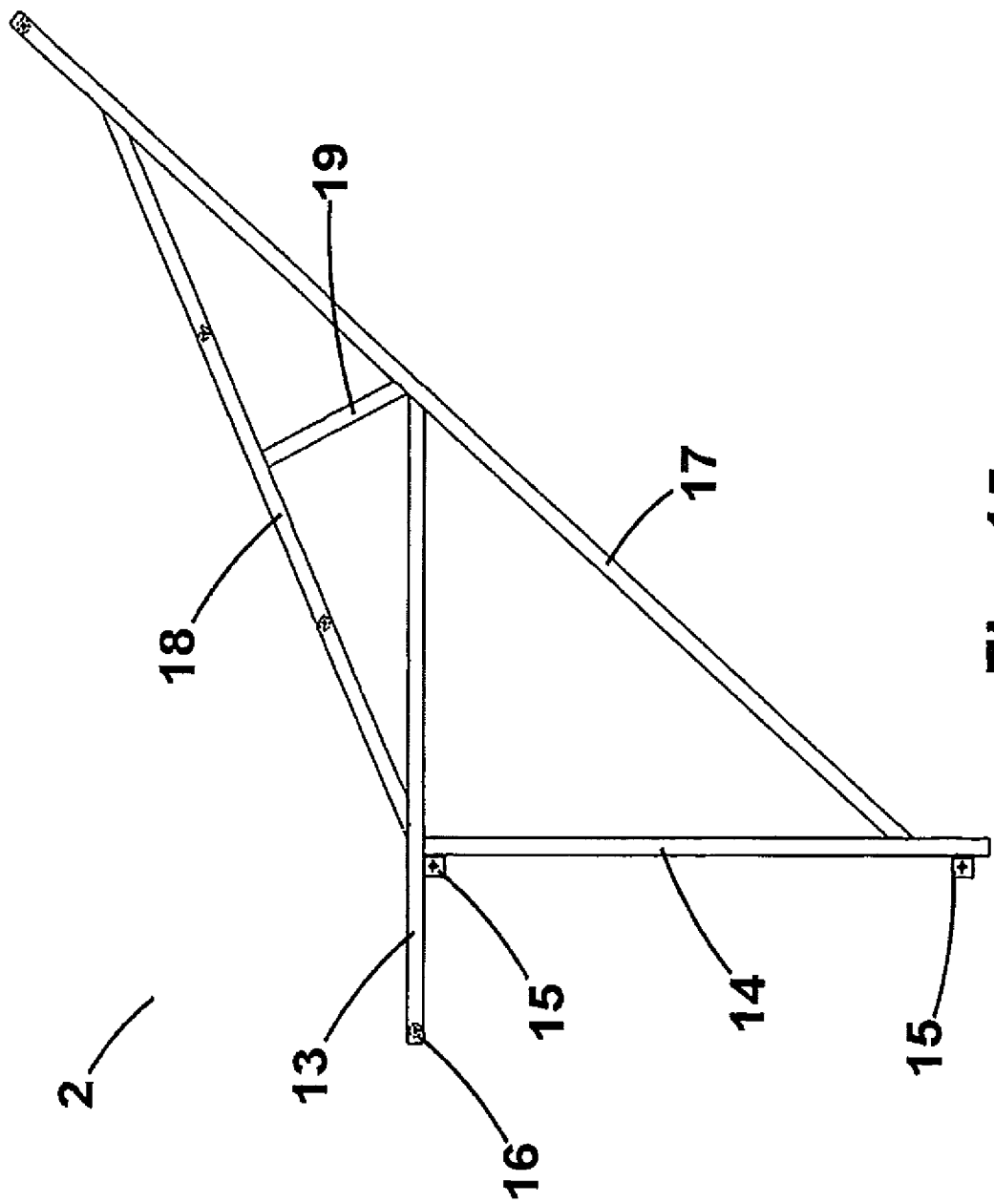
FIG. 15 shows a side view of one of the support arms.

The support structure for solar collector that is the object of the present invention is basically formed, as can be seen in the attached drawing, by a main bearing structure (1) on which a plurality of laterally arranged support arms (2) for the parabolic mirrors (3) are supported, the main bearing structure (1) comprising two identical rectangular lattice grids (4), a top one and another bottom one, in a parallel and overlaying arrangement, linked together by four laterally disposed mini-lattices (5), in twos at each end, and by a plurality of external lateral tie bars (6) and internal diagonal tie bars (7)

Emerging perpendicularly from the top part of the main bearing structure (1) is a plurality of supports (8) for the absorbing tube, of an appropriate length to position it in the focus of the parabola formed by the parabolic mirrors (3) mounted on the support arms (2).

The rectangular grids (4) are formed by an external frame (9) in which is distributed a plurality of cross members (10) with the appropriate angle to optimize the torsional strength of the grid.

Both the grids (4) and the external lateral tie bars (6) and internal diagonal tie bars (7) will preferably be made with "L"-section metal profiles.

The main bearing structure (1) is finished off, at both ends, by two end plates (11.12) that include the support points for pillars, not depicted in the drawings, anchored to the ground, that give the collector assembly the necessary rotation axis.

The support arms (2) are formed by two perpendicular pieces, one horizontal piece (13) and another vertical piece (14) fitted with strips (15) and with perforations (16) for attachment to the main bearing structure, being linked together by a first slanting piece (17) that goes from the lower part of the vertical piece (14), passing, approximately in its middle part, through the end of the horizontal piece (13), and in turn being supported by a second slanting piece (18) that goes from approximately the coupling of the horizontal piece (13) and vertical piece (14) up to nearly the top end of the first slanting piece (17). Between the two slanting pieces (17.18), starting from near to the end of the horizontal piece (13) is a third slanting reinforcement piece (19).

All of the component pieces of the support arms (2), except for the attachment strips, are preferably made of rectangular section metal tube and are welded together.

Coupling of the different elements of the structure, both the coupling between the longitudinal members (9) and cross members (10) of the rectangular grids (4), as well as the coupling of the rectangular grids (4) with the mini-lattices (5), the lateral tie bars (6) or diagonal tie bars (7), the coupling with the end plates (11,12), the coupling of the supports (8) for the absorbing tube, or the coupling with the support arms (2) will be carried out using conventional mechanical means, such as rivets, screws and nuts, or any combination of these.

In a preferential embodiment, screws, washers and nuts will solely be used to attach the pillars to the anchor bolts, to attach the parabolic mirrors to the support structure and to attach the spring-plates of the supports (8) of the absorbing tube to the main bearing structure (1), whilst the rest of the components of the support structure are factory-welded, or are assembled on site by means of rivets.

The invention claimed is:

1. A support structure for a solar collector of a type used in cylindrical parabolic collectors to support a cylindrical parabolic reflector and an absorbing tube, comprising:
    a main bearing structure (1), the main bearing structure (1) further comprising two identical rectangular lattice grids (4);
    a plurality of laterally arranged support arms (2) adapted to support a plurality of parabolic mirrors (3), the support arms (2) being supported on the main bearing structure;
    wherein the two identical rectangular lattice grids (4) are arranged as a top rectangular lattice grid (4) and a bottom rectangular lattice grid (4), in a parallel and overlaying arrangement;
    wherein the two identical rectangular lattice grids (4) are linked together by four laterally-disposed mini-lattices (5) and by a plurality of external lateral tie bars (6) and internal diagonal tie bars (7); and
    wherein the main bearing structure (1) has, at both ends, by two end plates (11,12) that include a plurality of support points for legs anchored to a ground surface that give the solar collector the necessary rotation axis.

2. Support structure for solar collector according to claim 1, wherein the two rectangular grids (4) are formed by an external frame (9) in which is distributed a plurality of cross members (10) with the appropriate angle to optimize the torsional strength of the grid.

3. Support structure for solar collector according to claim 1, wherein both the grids (4) and the external lateral tie bars (6) and internal diagonal tie bars (7) are made with "L" section metal profiles.

4. A support structure for a solar collector of the type used in cylindrical parabolic collectors to support a cylindrical parabolic reflector and an absorbing tube, comprising:
    a main bearing structure (1), the main bearing structure (1) further comprising two identical rectangular lattice grids (4);
    a plurality of laterally arranged support arms (2) adapted to support a plurality of parabolic mirrors (3), the support arms (2) being supported on the main bearing structure;
    wherein the two identical rectangular lattice grids (4) are arranged as a top rectangular lattice grid (4) and a bottom rectangular lattice grid (4), in a parallel and overlaying arrangement,
    wherein the two identical rectangular lattice grids (4) are linked together by four laterally-disposed mini-lattices (5), in twos at each end, and by a plurality of external lateral tie bars (6) and internal diagonal tie bars (7);
    wherein the support arms (2) are formed by two perpendicular pieces, one horizontal piece (13) and another vertical piece (14), fitted with strips (15) and with perforations (16) to attach them to the main bearing structure, being linked together by a first slanting piece (17) that goes from the lower part of the vertical piece (14), passing, approximately in its middle part, through the end of the horizontal piece (13), and in turn being supported by a second slanting piece (18) that goes from approximately the coupling of the horizontal piece (13) and vertical piece (14) up to nearly the top end of the first slanting piece (17); and
    wherein, between the two slanting pieces (17,18), starting from near to the end of the horizontal piece (13), is a third slanting reinforcement piece (19).

5. A support structure for a solar collector of the type used in cylindrical parabolic collectors to support the cylindrical parabolic reflector and an absorbing tube, comprising:
    a main bearing structure (1), the main bearing structure (1) further comprising two identical rectangular lattice grids (4);
    a plurality of laterally arranged support arms (2) adapted to support a plurality of parabolic mirrors (3), the support arms (2) being supported on the main bearing structure;
    wherein the two identical rectangular lattice grids (4) are arranged as a top rectangular lattice grid (4) and a bottom rectangular lattice grid (4), in a parallel and overlaying arrangement,
    wherein the two identical rectangular lattice grids (4) are linked together by four laterally-disposed mini-lattices (5), in twos at each end, and by a plurality of external lateral tie bars (6) and internal diagonal tie bars (7);
    wherein the support arms (2) are formed by two perpendicular pieces, one horizontal piece (13) and another vertical piece (14), fitted with strips (15) and with perforations (16) to attach them to the main bearing structure, being linked together by a first slanting piece (17) that goes from the lower part of the vertical piece (14), passing, approximately in its middle part, through the end of the horizontal piece (13), and in turn being supported by a second slanting piece (18) that goes from approximately the coupling of the horizontal piece (13) and vertical piece (14) up to nearly the top end of the first slanting piece (17);
    wherein, between the two slanting pieces (17,18), starting from near to the end of the horizontal piece (13), is a third slanting reinforcement piece (19); and
    wherein the component pieces of the support arms (2), except for the attachment strips, are made of rectangular section metal tube and are welded together.

6. Support structure for solar collector according to claim 1, wherein emerging perpendicularly from the top part of the main bearing structure (1) there is a plurality of supports (8) for the absorbing tube, of an appropriate length to position it in the focus of a parabola formed by the parabolic mirrors (3) mounted on the support arms (2).

7. Support structure for solar collector according to claim 1, wherein conventional mechanical means couple a plurality of longitudinal members (9) and cross members (10) of the rectangular grids (4), the rectangular grids (4) with the mini-lattices (5), the lateral tie bars (6) or diagonal tie bars (7), the end plates (11,12), the supports (8) for the absorbing tube, or the support arms (2).

* * * * *